(12) United States Patent
Dethier

(10) Patent No.: US 10,041,480 B2
(45) Date of Patent: Aug. 7, 2018

(54) SOLAR CONCENTRATION TOWER WITH EXTERNAL RECEIVER

(71) Applicant: Cockerill Maintenance & Ingenierie S.A., Seraing (BE)

(72) Inventor: Alfred Dethier, Sprimont (BE)

(73) Assignee: COCKERILL MAINTENANCE & INGENIERIE S.A., Seraing (BE)

( * ) Notice: Subject to any disclaimer, the term of this patent is extended or adjusted under 35 U.S.C. 154(b) by 120 days.

(21) Appl. No.: 15/310,106

(22) PCT Filed: Mar. 5, 2015

(86) PCT No.: PCT/EP2015/054638
§ 371 (c)(1),
(2) Date: Nov. 10, 2016

(87) PCT Pub. No.: WO2015/172906
PCT Pub. Date: Nov. 19, 2015

(65) Prior Publication Data
US 2017/0138352 A1    May 18, 2017

(30) Foreign Application Priority Data
May 14, 2014    (BE) .................... 2014/0358

(51) Int. Cl.
*F03G 6/06*    (2006.01)
*F24J 2/07*    (2006.01)
*F24J 2/24*    (2006.01)
(52) U.S. Cl.
CPC ............. *F03G 6/064* (2013.01); *F24J 2/07* (2013.01); *F24J 2/24* (2013.01); *Y02E 10/41* (2013.01); *Y02E 10/44* (2013.01)

(58) Field of Classification Search
CPC .......... Y02E 10/40; Y02E 10/41; Y02E 10/44; Y02E 10/46; F24J 2/07; F24J 2002/075; F03G 6/00; F03G 6/003; F03G 2006/008
(Continued)

(56) References Cited

U.S. PATENT DOCUMENTS

2010/0199980 A1    8/2010   Ricci et al.
2012/0312296 A1    12/2012  Morse et al.

FOREIGN PATENT DOCUMENTS

EP    0106688 A2    4/1984
EP    1243872 A2    9/2002
(Continued)

*Primary Examiner* — Mark Laurenzi
*Assistant Examiner* — Mickey France
(74) *Attorney, Agent, or Firm* — Leydig, Voit & Mayer, Ltd.

(57) ABSTRACT

An external solar receiver for a tower solar concentration thermodynamic plant and a field of heliostats includes a plurality of panels wherein each panel with heat exchanger tubes is connected to an interior support element, with an axis substantially perpendicular to the panel, the interior support element being furthermore connected in a rotary manner to a support element belonging to the internal structure by means of at least two parallel, substantially horizontal connecting rods. The connecting rods are each articulated at a first end on the interior support element and at a second end on the support element, respectively, so that under the effect of thermal expansion or contraction of the panels with heat exchangers, each of the panels moves substantially parallel to itself and without deformation of the surface thereof, and in such a way that the polygonal or circular cross-section of the receiver undergoes a homothetic transformation.

5 Claims, 3 Drawing Sheets

(58) Field of Classification Search
USPC .................. 60/641.1, 641.8, 641.11, 641.15
See application file for complete search history.

(56) References Cited

FOREIGN PATENT DOCUMENTS

| WO | WO 2010048578 A1 | 4/2010 |
| WO | WO 2013019670 A2 | 2/2013 |

SOLAR CONCENTRATION TOWER WITH EXTERNAL RECEIVER

CROSS-REFERENCE TO RELATED APPLICATIONS

This application is a U.S. national stage application under 35 U.S.C. § 371 of International application No. PCT/EP2015/054638, filed on Mar. 5, 2015, and claims benefit to Belgian patent application No. 2014/0358, filed on May 14, 2014. The International application was published in French on Nov. 19, 2015, as WO 2015/172906 A1 under PCT Article 21(2).

FIELD

The present invention relates to the technical field of concentrating thermodynamic solar power plants (CSP), and more particularly of solar power plants of the tower type.

BACKGROUND

In a concentrating solar power plant of the tower type, solar radiation is reflected by a series of mirrors, called heliostats, toward a central solar receiver situated on a tower, which transfers the energy from the solar radiation to a heat-transfer fluid that will heat up and hence be usable to produce power.

The heliostats are provided with two rotation mechanisms allowing to track the sun and to always return the solar flux toward a given point, irrespective of the time of day and season.

The solar receiver is installed at the apex of a tower so as to receive solar radiation from all the heliostats with no heliostat hindering the reflection of the flux coming from an adjacent heliostat.

The hot fluid that is generated in the solar receiver may for example be high-pressure and high-temperature steam generated from feed water. The steam can then be directly used in a steam turbine driving a power generator.

The hot fluid may also be a mixture of salts used as a heat fluid that can be stored on the ground in large quantities and used in parallel to the production of steam and the generation of electric power. It is therefore possible to separate the collection of solar energy and the production of power.

The solar receiver installed at the apex of the tower may be of the cavity type or of the external type. In the first case, the cavities are provided on their inside with tube panels, capturing the solar rays, and the effect of the cavity is to reduce radiation losses. In the case of the external type, the tube panels capturing solar radiation are installed outside and all around the tower. Losses are slightly greater relative to the cavity system, but it is easier to concentrate the solar radiation therein, the average thermal flux being significantly higher and the surface of the panels being greatly reduced for a same power.

In the external solution, the planar panels are juxtaposed to form a straight prism with a regular polygonal base. Depending on the installed powers, the polygonal base may have a variable number of faces, for example from 4 to 32.

Common practice is to fasten each of the panels to a stationary structure. Each of the panels can then freely expand under the effect of the temperature increase following the capture of the solar energy.

Document U.S. 2012/312296 discloses a solar boiler comprising a boiler support defining an axis along an inboard-outboard direction. A hanger rod or vertical connecting rod is rotatably mounted to the boiler support. A bracket is mounted rotatably to the hanger rod and a solar boiler panel is mounted to the bracket. The panel of the solar boiler defines a longitudinal axis that is substantially perpendicular to the axis of the boiler support. The hanger rod connects the boiler support to the bracket in order to support the weight of the panel of the solar boiler from the boiler support. The hanger rod and the bracket are configured and adapted to maintain a substantially constant orientation of the bracket during the inward and outward movement of the bracket relative to the boiler support. Indeed, according to one illustrated embodiment, two vertical connecting rods that are parallel to each other form a parallelogram link with the boiler support and the bracket. The connecting rods serve to support the weight of the panel. The latter deforms under the effect of thermal expansion or contraction of the solar panel, but the upward movement of bracket under the effect of the rotation of the connecting rods is negligible. As a result, the solar panel moves practically parallel to itself. The solar panels are not connected to each other. The wind forces are reacted by a shock absorber connecting the bracket to the structure. It is not mentioned that the solar panels can be connected to each other.

Document EP 1 243 872 discloses a solar collector with a plurality of absorbing bodies that absorb solar radiation. These absorbing bodies are porous and allow the passage of aspirated air. The support structure for the solar receivers is formed by modules that have a front wall, a back wall, side walls and a cavity. Tubes pass through each module, those tubes conveying hot air into a collector. Cool air flows countercurrent through cool-air inlets in the cavity. The cool air flows around the absorbing bodies. Since they are cooled, the modules may be made from steel without any risk of overheating. The solar receiver is stable and does not require a stop device in the hot air enclosure. The different modules are mounted adjacent to connecting elements, so that they can withstand thermal expansion without tension. Also, the adjacent sides of the modules do not touch over their entire surface, and corner-shaped gaps are provided to that end. Furthermore, the various vertically-mounted modules are connected by their upper portion to the inner wall by an articulated link, which allows expansion in the vertical direction.

Document WO 2013/019670 describes a modular solar receiver, having multiple tube panels in a rectangular, square, polygonal or circular configuration and designed to be used with fused salt or with another heat-transfer fluid. The heat-transfer fluid flows along a vertical path winding through the sides (facets) of the solar receiver. The solar receiver may be assembled in the warehouse and may be used with a support tower to form a solar power system.

Document WO 2010/048578 discloses a heat exchanger with solar receiver assembled in the warehouse and having an arrangement of heat-transfer surfaces and a vertical steam/water separator that is structurally and fluidically interconnected thereto. A vertical support structure is provided to support the vertical separator and the heat-transfer surfaces. The vertical support structure is supported from underneath, while the vertical steam/water separator and the heat-transfer surfaces of the heat exchanger are supported from above from the vertical support structure. The vertical support structure provides structural support and rigidity for the heat exchanger and a means by which the heat exchanger can be grasped and lifted to be placed at a desired location.

In the latter two installations, horizontal reinforcing ribs or beams are attached to the solar tube panels. All the panels are supported from above and suspended from the support structure inside the receiver. Each tube panel comprises two interconnecting plates. Each plate is connected by two bars, pivoting at their ends using pins, to a tab that is attached to a flexion support that in turn is attached by structural steel to the columns comprising the vertical support structure of the receiver. The pivoting bars allow a certain rotation of the solar panels and therefore allow to react the average thermal expansion of the supported panels. This system provides horizontal stability to the tube panels while allowing the tubes a free and independent vertical extension, with reduced tension on the tubes. Here also, the adjacent tube panels, on each face and at each level (top/bottom), are laterally (horizontally) separated from one another, which allows differential expansion of the tube panels, without tension.

Document EP 0 106 688 discloses a receiver for receiving solar radiation energy, characterized by a plurality of steam generating tube panels suitable to receive a flow of liquid to be heated and to produce steam, and a plurality of superheating tube panels suitable to receive a flow of steam to be superheated, the steam generating tube panels and the superheating tube panels being positioned in a side-by-side relationship to receive the solar radiation energy, and the superheating tube panels being intercalated with the steam generating tube panels according to a sequence of at least twelve panels, such that each sequence of four panels among at least twelve panels comprises at least one superheating tube panel and at least one steam generating tube panel. The problem here arises from the fact that the superheating tube panels undergo a much greater longitudinal expansion than the steam generating tube panels. Similarly to the preceding case, the superheating tube panels are connected by connecting rods to horizontal reinforcing ribs. This system allows the superheating tube panels to move vertically relative to the horizontal ribs, and therefore relative to the steam generating tube panels.

SUMMARY

An aspect of the invention provides a straight cylindrical or prismatic external solar receiver, including a regular polygonal section, for a concentrating thermodynamic solar power plant of a tower and heliostat field type, the receiver comprising: an internal structure; and a plurality of panels of heat exchange tubes, the heat exchange tubes containing a heat-transfer fluid that is suitable for absorbing energy from solar radiation, wherein the panels make up a cylindrical surface portion or a vertical prismatic face of the solar receiver, wherein the panels are vertically positioned and connected in pairs by an articulated link along an adjacent vertical side, wherein each heat exchange tube panel is connected to at least one internal support element having an axis substantially perpendicular to the panel, wherein the internal support element is rotatably connected to a support element of the internal structure using at least two parallel connecting rods. The parallel connecting rods are substantially horizontal and respectively articulated at a first end on the internal support element and at a second end on the support element of the internal structure, respectively, such that, under thermal expansion or contraction of the heat exchange tube panels, each of the heat exchange tube panels moves substantially parallel to itself and without deformation of its surface, and such that the polygonal or a circular section of the receiver then undergoes a homothetic transformation.

BRIEF DESCRIPTION OF THE FIGURES

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
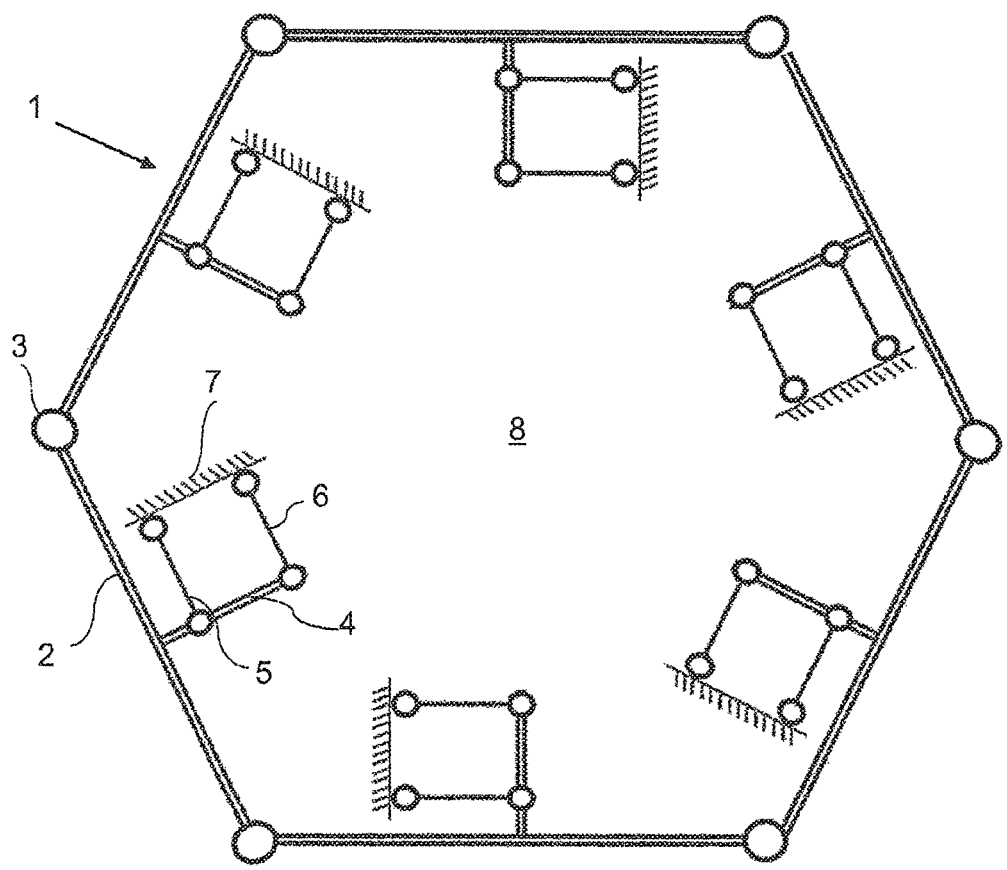
FIG. 1 shows a diagrammatic planar view of an external solar receiver with a hexagonal section, mounted to a concentrating solar tower according to the present invention.

The state of the art does not solve the problem of thermal expansion in an external solar receiver where the panels form a prism with a polygonal section, i.e., where the adjacent panels are connected to each other laterally.

An aspect of the present invention provides a solution allowing to react the lateral expansion of the panels in a straight prismatic external receiver with a regular polygonal section, when the panels are connected to each other in pairs by an adjacent side.

A first aspect of the present invention relates to a straight cylindrical or prismatic external solar receiver, with a regular polygonal section, for concentrating thermodynamic solar power plants of the tower and heliostat field type, comprising an internal structure and a plurality of panels of heat exchange tubes containing a heat-transfer fluid that is suitable for absorbing the energy from solar radiation, said panels, making up a cylindrical surface portion or a vertical prismatic face of said solar receiver depending on the case, being vertically positioned and connected in pairs by an articulated link along an adjacent side, characterized in that each heat exchange tube panel is connected to at least one internal support element, with an axis that is substantially perpendicular to the panel, that internal support element being further rotatably connected to a support element belonging to the aforementioned internal structure using at least two parallel connecting rods, substantially horizontal, respectively articulated at a first end on the internal support element and at a second end on the support element of the internal structure, respectively, such that, under the effect of thermal expansion or contraction of the heat exchange tube panels, each of the latter moves substantially parallel to itself and without deformation of its surface, and such that the polygonal or circular section of the receiver then undergoes a homothetic transformation.

According to preferred embodiments of the invention, the external solar receiver further comprises at least one of the following features:

the internal support element comprises a rod, a plate or a bracket;

the heat-transfer fluid comprises liquid water and/or water as steam;

the heat-transfer fluid comprises a mixture of fused salts.

A second aspect of the present invention relates to a concentrating thermodynamic solar power plant of the tower type, comprising an external solar receiver as described above.

An embodiment of the present invention includes:
connecting all the panels to each other, and forcing each panel to move parallel to itself, by means of a system of connecting rods, i.e., rods that are articulated at both of their ends.

The prism with a polygonal section can thus expand completely freely under the effect of the temperature increase, and conversely freely contract if the temperature decreases. The connecting rods allow to react the wind forces or the forces resulting from any possible earthquake by maintaining the shape of the prism.

FIG. 1 diagrammatically shows an external receiver 1 for a tower solar power plant 8, in the form of a straight regular prism with six faces 2 serving as absorbing panels, that is to say with a hexagonal section, in the case at hand for illustration purposes, that number of faces not being limiting. The panels 2 are connected to each other in pairs by an articulated link 3 and each panel 2 can move parallel to itself thanks to a fastener 4 that is perpendicular to the panel 2. The fastener 4, for example assuming the form of a rod, plate or bracket, is secured to two connecting rods 5, 6 that are parallel to each other and articulated on the one hand to a stationary support structure or framework 7, inside the tower 8, and on the other hand to the fastener 4.

The connecting rods 5, 6 that are substantially horizontal and parallel to each other are connected to a panel 2 and force the latter to move practically parallel to itself, over a circle having a radius that is equal to the length of the connecting rod. However, the movements caused by the thermal expansion of the panels are limited, given the width of the panels, approximately 1 to 1.5%. It can thus be said that each panel moves parallel to itself in a direction that is normal to itself. Given their horizontal position, the connecting rods 5, 6 have no support function for the weight of the solar panel as in U.S. 2012/312296.

The wind force acting on one or several panels 2 is distributed over all the connecting rods 5, 6, according to a given mathematical distribution.

Figure 2:
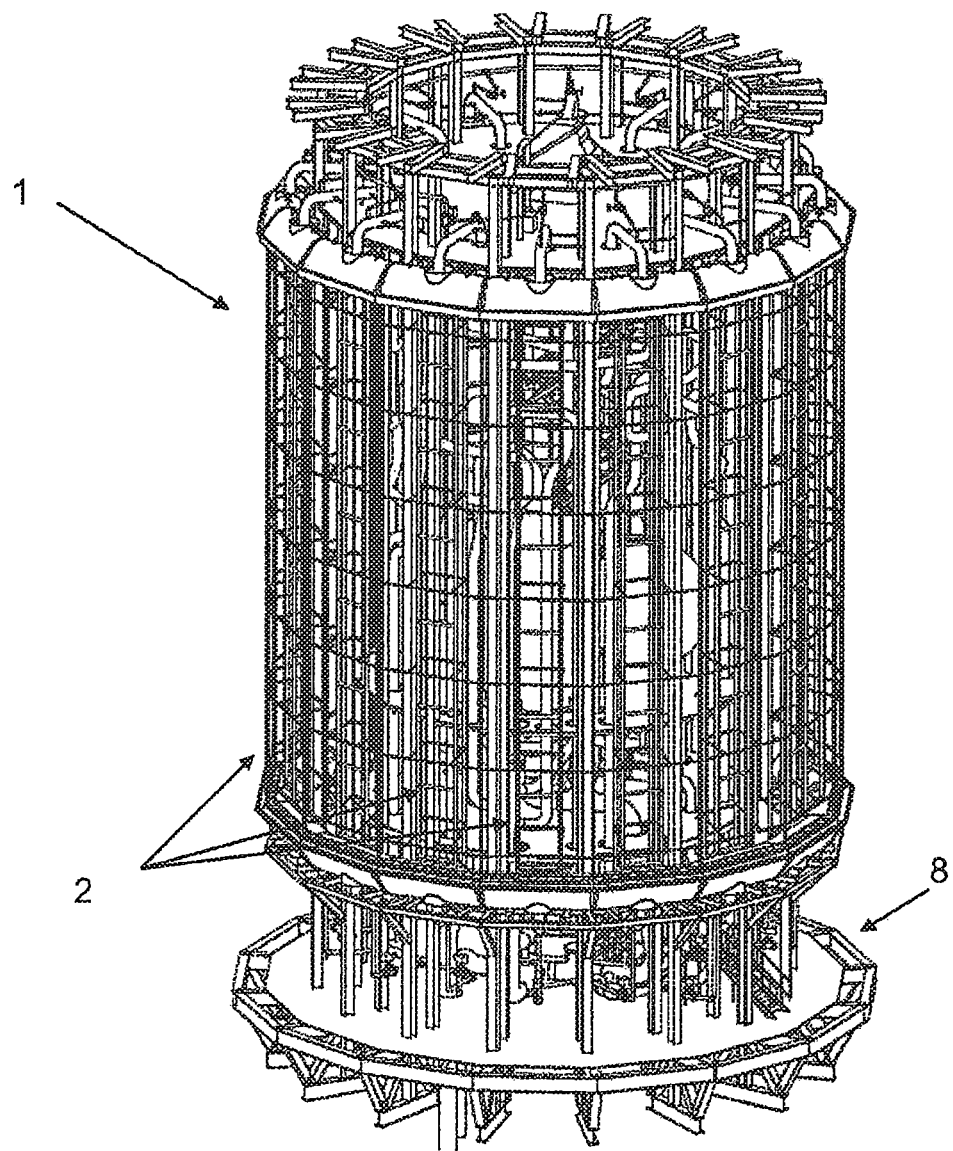
FIG. 2 shows a perspective view of an example of a concentrating solar tower comprising an external solar receiver with 16 faces according to the present invention.
Figure 3:
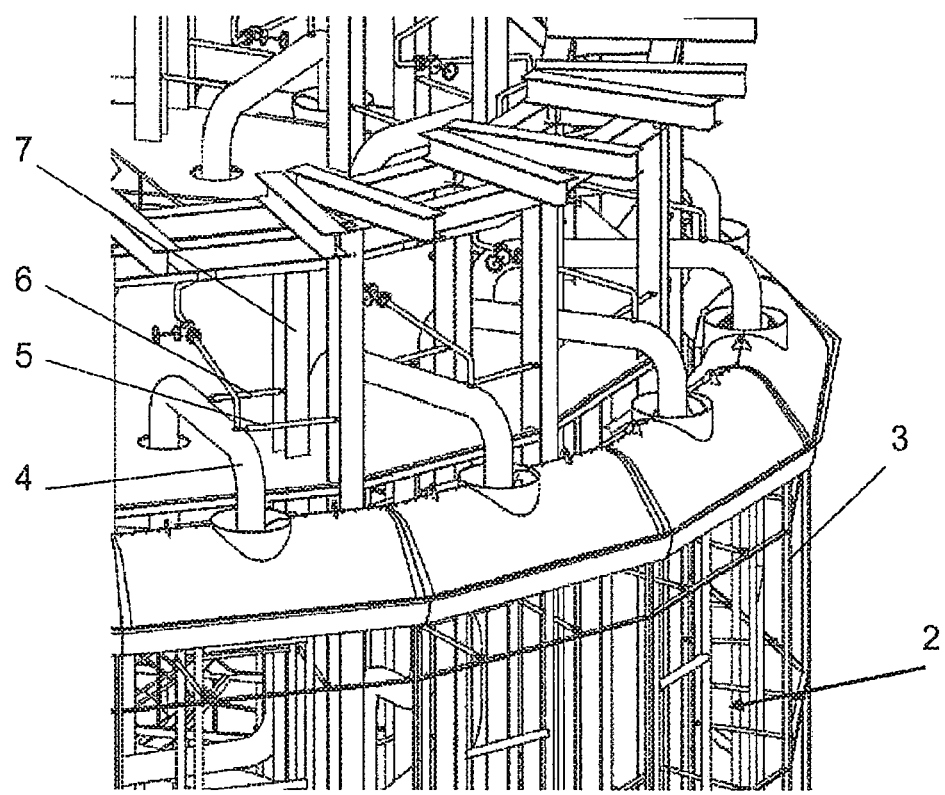
FIG. 3 shows a detailed view of the solar tower of FIG. 2, showing the features of the invention.

FIG. 2 shows a realistic example of a fused-salts receiver for a tower solar power plant, in the form of a regular polygonal prism with 16 faces, with a diameter equal to 18 m. The height of the panels is 18.4 m. A set of connecting rods and links is installed in the lower portion of the panels and in the upper portion, reacting all the panels. The captured power is 700 MW.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

REFERENCE SYMBOLS 1 external receiver
2 absorbing panel
3 articulated link
4 Panel fastener
5 connecting rod
6 connecting rod
7 framework
8 solar tower

The invention claimed is:

1. A straight cylindrical or prismatic external solar receiver, including a regular polygonal section, for a concentrating thermodynamic solar power plant of a tower and heliostat field type, the receiver comprising:
an internal structure; and
a plurality of panels of heat exchange tubes, the heat exchange tubes containing a heat-transfer fluid that is suitable for absorbing energy from solar radiation,
wherein the panels make up a cylindrical surface portion or a vertical prismatic face of the solar receiver,
wherein the panels are vertically positioned and connected in pairs by an articulated link along an adjacent vertical side,
wherein each heat exchange tube panel is connected to at least one internal support element having an axis substantially perpendicular to the panel,
wherein the internal support element is rotatably connected to a support element of the internal structure using at least two parallel connecting rods,
wherein the parallel connecting rods are substantially horizontal and respectively articulated at a first end on the internal support element and at a second end on the support element of the internal structure, respectively, such that, under thermal expansion or contraction of the heat exchange tube panels, each of the heat exchange tube panels moves substantially parallel to itself and without deformation of its surface, and such that the polygonal or a circular section of the receiver then undergoes a homothetic transformation.

2. The receiver of claim 1, wherein the internal support element includes a rod, a plate, or a bracket.

3. The receiver of claim 1, wherein the heat-transfer fluid comprises liquid water and/or water as steam.

4. The receiver of claim 1, wherein the heat-transfer fluid comprises a mixture of fused salts.

5. A concentrating thermodynamic solar power plant, of the tower type, the plant comprising the receiver of claim 1.

* * * * *